(12) United States Patent
Summer

(10) Patent No.: US 10,355,579 B2
(45) Date of Patent: Jul. 16, 2019

(54) CRYOGENIC OPERATION, RADIATION TOLERANT, LOW QUIESCENT CURRENT, LOW DROP OUT VOLTAGE REGULATOR

(71) Applicant: Steven E. Summer, Plandome, NY (US)

(72) Inventor: Steven E. Summer, Plandome, NY (US)

( * ) Notice: Subject to any disclaimer, the term of this patent is extended or adjusted under 35 U.S.C. 154(b) by 0 days.

(21) Appl. No.: 15/972,920

(22) Filed: May 7, 2018

(65) Prior Publication Data

US 2018/0331614 A1 Nov. 15, 2018

Related U.S. Application Data

(60) Provisional application No. 62/504,988, filed on May 11, 2017.

(51) Int. Cl.
G05F 1/648 (2006.01)
H02M 1/08 (2006.01)
G05F 1/625 (2006.01)
H02M 1/00 (2006.01)

(52) U.S. Cl.
CPC ............. H02M 1/08 (2013.01); G05F 1/625 (2013.01); *H02M 2001/0003* (2013.01)

(58) Field of Classification Search
CPC .......... G05F 1/625; G05F 1/648; G05F 1/468; G05F 1/56; G05F 1/575; G05F 5/00; G05F 3/158; H02M 1/08; H02M 2001/0003; H02M 3/135; H02M 3/145; H02M 3/155
See application file for complete search history.

(56) References Cited

U.S. PATENT DOCUMENTS

| | | | | | |
|---|---|---|---|---|---|
| 3,571,694 | A | * | 3/1971 | Hunger | ..................... G05F 3/20 323/313 |
| 5,023,543 | A | * | 6/1991 | Tse | ............................ G05F 3/20 323/314 |
| 10,025,334 | B1 | * | 7/2018 | Derman | ................... G05F 1/575 |
| 2008/0048631 | A1 | * | 2/2008 | Kim | ........................ H02M 3/157 323/283 |
| 2008/0054867 | A1 | * | 3/2008 | Soude | ..................... G05F 1/575 323/282 |
| 2008/0116862 | A1 | * | 5/2008 | Yang | ....................... G05F 1/575 323/269 |
| 2009/0015227 | A1 | * | 1/2009 | Wong | .................... H02M 3/156 323/283 |
| 2010/0033144 | A1 | * | 2/2010 | Chen | ........................ G05F 1/56 323/280 |
| 2010/0073070 | A1 | * | 3/2010 | Ng | ............................ G05F 3/30 327/513 |
| 2012/0049829 | A1 | * | 3/2012 | Murakami | .............. H02M 1/32 323/288 |
| 2015/0286236 | A1 | * | 10/2015 | Dornseifer | ................ G05F 3/08 323/313 |
| 2017/0031374 | A1 | * | 2/2017 | Su | ........................... G05F 1/575 |

\* cited by examiner

*Primary Examiner* — Adolf D Berhane
(74) *Attorney, Agent, or Firm* — Feldman Law Group, P.C.; Steven M. Crosby

(57) ABSTRACT

A voltage regulator that includes an input voltage; a first JFET transistor, the input voltage being applied to a drain of the first JFET transistor; a second JFET transistor, the input voltage being applied to a drain of the second JFET transistor; and a resistor string, the resistor string including a first resistor, a second resistor and a third resistor, the resistor string and the second JFET transistor forming a voltage reference circuit having a reference voltage.

9 Claims, 5 Drawing Sheets

Cryogenic Operation, Radiation Tolerant
Low Quiescent Current,
Low Drop Out Linear Regulator

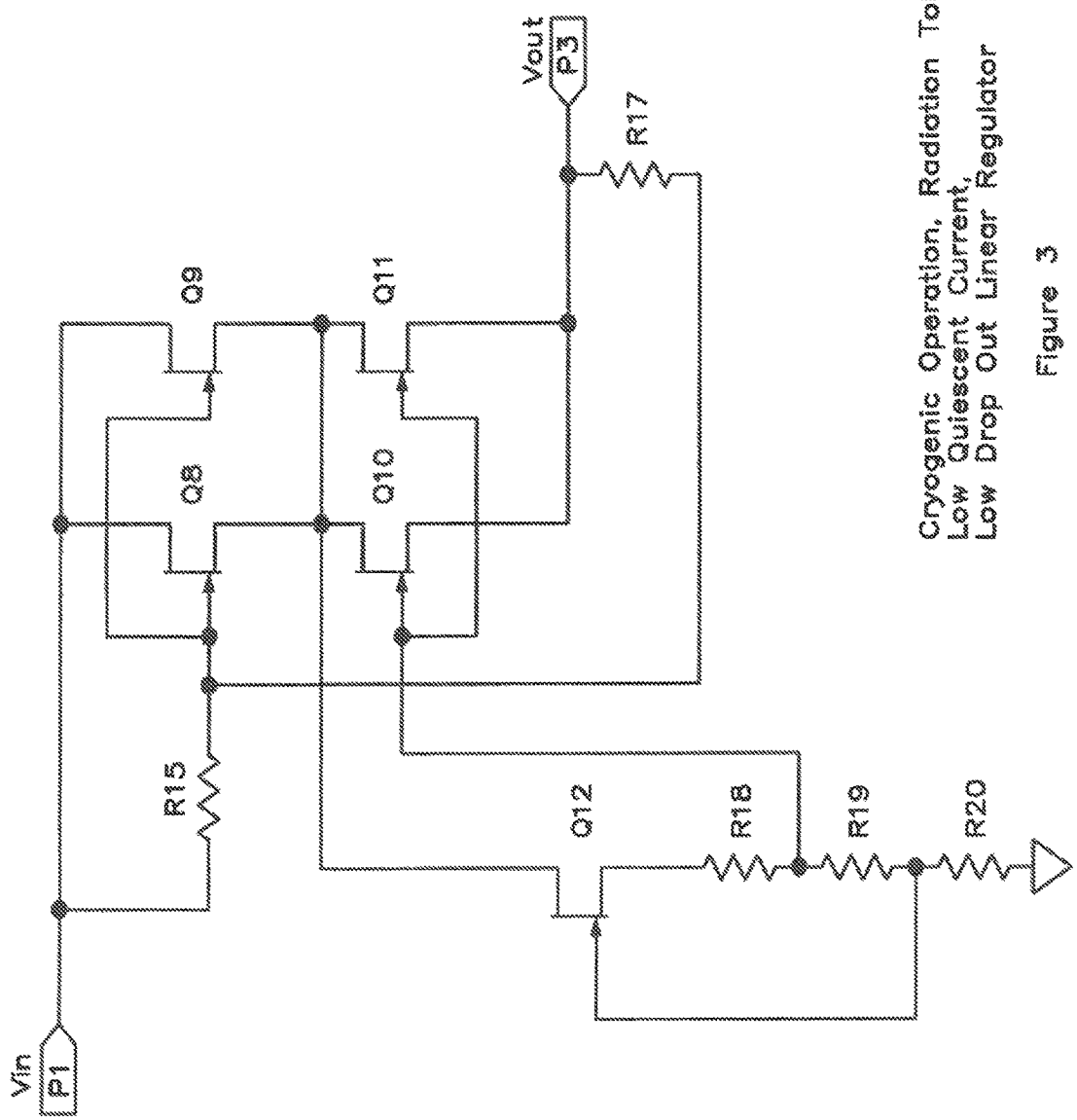

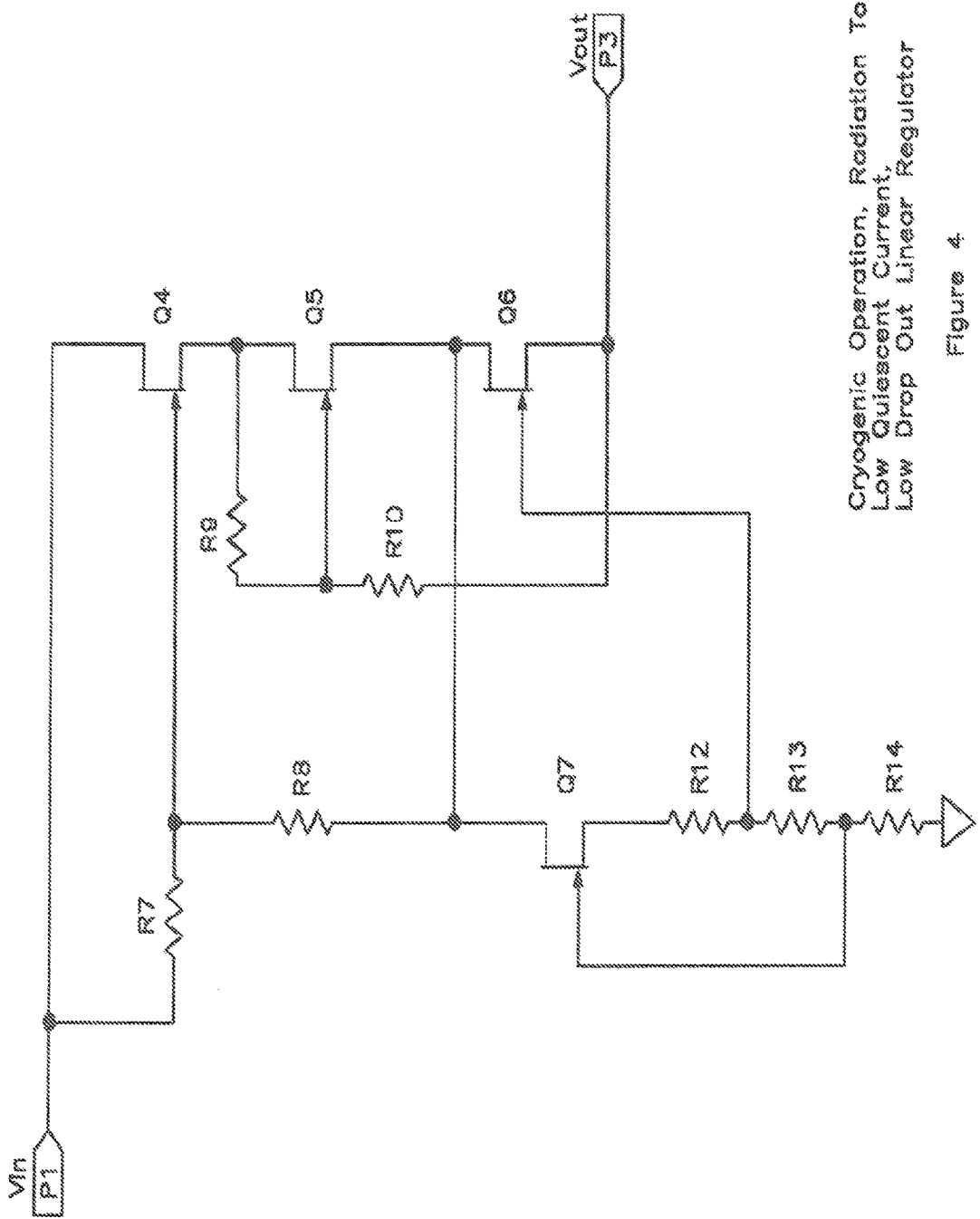

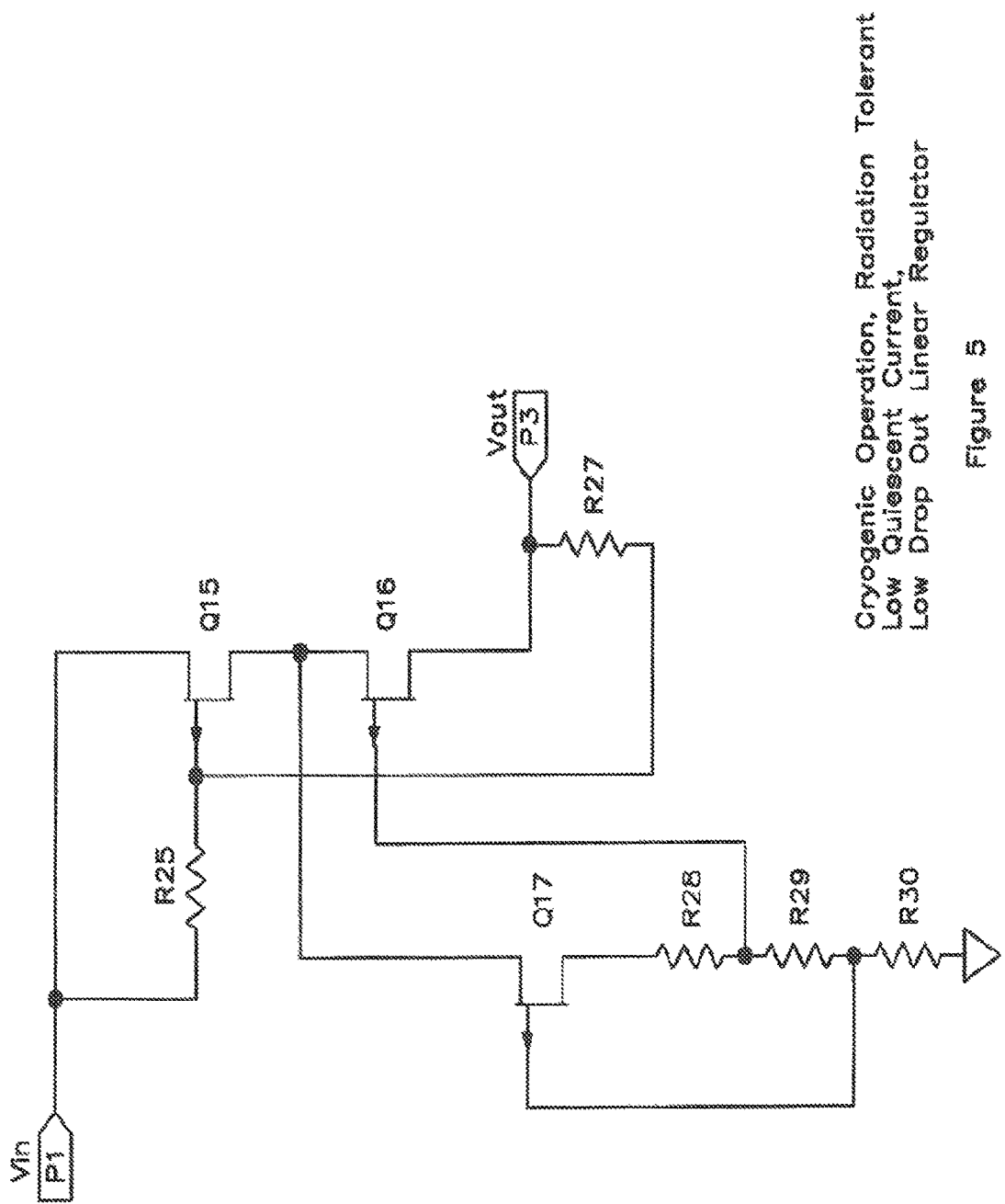

US 10,355,579 B2

CRYOGENIC OPERATION, RADIATION TOLERANT, LOW QUIESCENT CURRENT, LOW DROP OUT VOLTAGE REGULATOR

CROSS REFERENCE TO RELATED APPLICATION

This application is based on U.S. Provisional Pat. App. Ser. No. 62/504,988, filed on May 11, 2017. The provisional patent application identified above is incorporated here by reference in its entirety to provide continuity of disclosure.

BACKGROUND

Bipolar transistors, in discrete form and within integrated circuits, are minority carrier devices. Although many circuits of this type can operate down to −80 or −100 degrees Celsius, at more extreme cold temperatures, the current gain of bipolar semiconductors drops to levels that make the parts functionally unusable.

Majority carrier devices, such as insulated gate MOSFETs and MESFETs as well as junction FETs (JFETs), however, do not have this limitation to such an extent. In fact, the channel resistance of these devices reduces at extreme cold temperature, which can improve performance.

Both insulated gate and junction FETs are available as discrete elements or combined into an integrated circuit.

When exposed to ionizing radiation, a gate threshold of insulating gate devices, including CMOS parts, can shift considerably due to accumulation of radiation deposited charge within the gate oxide. Unless special methods are used to compensate for this voltage shift, most commercially available insulating gate devices are not functional after high radiation exposure.

SUMMARY

The purpose of this disclosed technology is to implement electronic circuits used in planetary exploration applications. These electronic circuits are capable of operating at cryogenic temperatures (such as 77K) and can withstand large amounts of ionizing radiation. Further, due to power limitations in planetary exploration vehicles, these electronic circuits should be highly efficient with low quiescent current consumption and low drop out characteristics.

This invention discloses a voltage regulator circuit that has the following desirable features:
  Operation over a wide temperature range such as 77K to 450K
  Operation withstanding up to 1 Megarad Total Ionizing Dose
  Components selected are characterized for ionizing dose radiation tolerance as well as cryogenic temperature operation
  Low input to output voltage drop at the point of regulation
  Very Low no load Quiescent current
  Capable of regulating over a wide input voltage range A benefit of this disclosed technology is that it is implemented with industry standard discrete parts, as opposed to using specially designed integrated circuits. This allows the function to be produced at relatively low cost.

In one implementation, a voltage regulator can comprise an input voltage; a first JFET transistor, the input voltage being applied to a drain of the first JFET transistor; a second JFET transistor, the input voltage being applied to a drain of the second JFET transistor; and a resistor string, the resistor string including a first resistor, a second resistor and a third resistor, the resistor string and the second JFET transistor forming a voltage reference circuit having a reference voltage.

In some implementations, the first JFET transistor and the second JFET transistor are N-channel JFET transistors. In some implementations, the first JFET transistor and the second JFET transistor are P-channel JFET transistors.

In some implementations, a voltage across the first resistor and the second resistor is approximately equal to a pinch-off voltage of the second JFET transistor. In some implementations, a current through the resistor string is essentially constant and the current is multiplied by an ohmic value of the resistor string with a constant reference voltage being applied to a gate of the first JFET transistor.

In some implementations, the voltage regulator can further comprise an output voltage, the output voltage being an approximate sum of the reference voltage and a pinch-off voltage of the first JFET transistor. In some implementations, the voltage regulator can further comprise an output voltage, the output voltage being approximately equal to the input voltage less a voltage drop across a channel resistance of the first JFET transistor.

In some implementations, an output voltage set point is adjusted higher by increasing a value of the third resistor. In some implementations, an output voltage set point is adjusted lower by increasing a value of the first resistor.

In another implementation, a voltage regulator can comprise an input voltage; a first JFET transistor, the input voltage being applied to a drain of the first JFET transistor; a second JFET transistor, the second JFET transistor being in series with the first JFET transistor; a third JFET transistor; a resistor string, the resistor string including a first resistor, a second resistor and a third resistor, the resistor string and the third JFET transistor forming a voltage reference circuit having a reference voltage; a voltage divider, the voltage divider including a fourth resistor and a fifth resistor, the fourth resistor and the fifth resistor dividing a difference between the input voltage and an output voltage, wherein the reference voltage generated from the voltage reference circuit is powered from a mid-point connection between the first JFET transistor and the second JFET transistor.

In some implementations, the first JFET transistor, the second JFET transistor and the third JFET transistor are N-channel JFET transistors. In some implementations, the first JFET transistor, the second JFET transistor and the third JFET transistor are P-channel JFET transistors.

In another implementation, a voltage regulator can comprise an input voltage; a first JFET transistor series, the first JFET transistor series including a first JFET transistor and a second JFET transistor connected in series; a second JFET transistor series, the second JFET transistor series including a third JFET transistor and a fourth JFET transistor connected in series, the first JFET transistor series being in parallel with the second JFET transistor series; a fifth JFET transistor a resistor string, the resistor string including a first resistor, a second resistor and a third resistor, the resistor string and the fifth JFET transistor forming a voltage reference circuit having a reference voltage; and a voltage divider, the voltage divider including a fourth resistor and a fifth resistor, wherein the voltage divider allows an input-output resistance at a point of regulation to be halved and an output current rating to be doubled.

In some implementations, the first JFET transistor, the second JFET transistor, the third JFET transistor, the fourth JFET transistor and the fifth JFET transistor are N-channel JFET transistors. In some implementations, the first JFET transistor, the second JFET transistor, the third JFET transistor, the fourth JFET transistor and the fifth JFET transistor are P-channel JFET transistors.

In another implementation, a voltage regulator can comprise an input voltage; a first JFET transistor, the input voltage being applied to a drain of the first JFET transistor; a second JFET transistor; a third JFET transistor, the first JFET transistor, the second JFET transistor the third JFET transistor being connected in series; a fourth JFET transistor; a resistor string, the resistor string including a first resistor, a second resistor and a third resistor, the resistor string and the fourth JFET transistor forming a voltage reference circuit having a reference voltage; a first voltage divider, the voltage divider including a fourth resistor and a fifth resistor, the fourth resistor and the fifth resistor being connected between the input voltage and a source of the second JFET transistor; and a second voltage divider, the second voltage divider including a sixth resistor and a seventh resistor, the second voltage divider being connected between a source of the first JFET transistor and a source of the third JFET transistor, wherein the first voltage divider and the second voltage divider are used to force approximately equal voltage sharing between the series of the first JFET transistor, the second JFET transistor the third JFET transistor.

In some implementations, the first JFET transistor, the second JFET transistor, the third JFET transistor and the fourth JFET transistor are N-channel JFET transistors. In some implementations, the first JFET transistor, the second JFET transistor, the third JFET transistor and the fourth JFET transistor are P-channel JFET transistors.

An advantage of the disclosed voltage regulator is that it allows a reference voltage to be adjustable by selecting appropriate resistors in a voltage reference circuit string. Also, the use of Zener diodes (having high current requirements and a high quiescent current drain) can be avoided.

BRIEF DESCRIPTION OF THE DRAWINGS

FIG. 3 is a circuit diagram for a linear regulator of the disclosed technology according to a third implementation;

FIG. 4 is a circuit diagram for a linear regulator of the disclosed technology according to a fourth implementation; and FIG. 5 is a circuit diagram for a linear regulator of the disclosed technology according to a fifth implementation.

DETAILED DESCRIPTION

The disclosed technology is directed towards a cryogenic operation, radiation tolerant, low quiescent current, low drop out voltage regulator.

Figure 1:
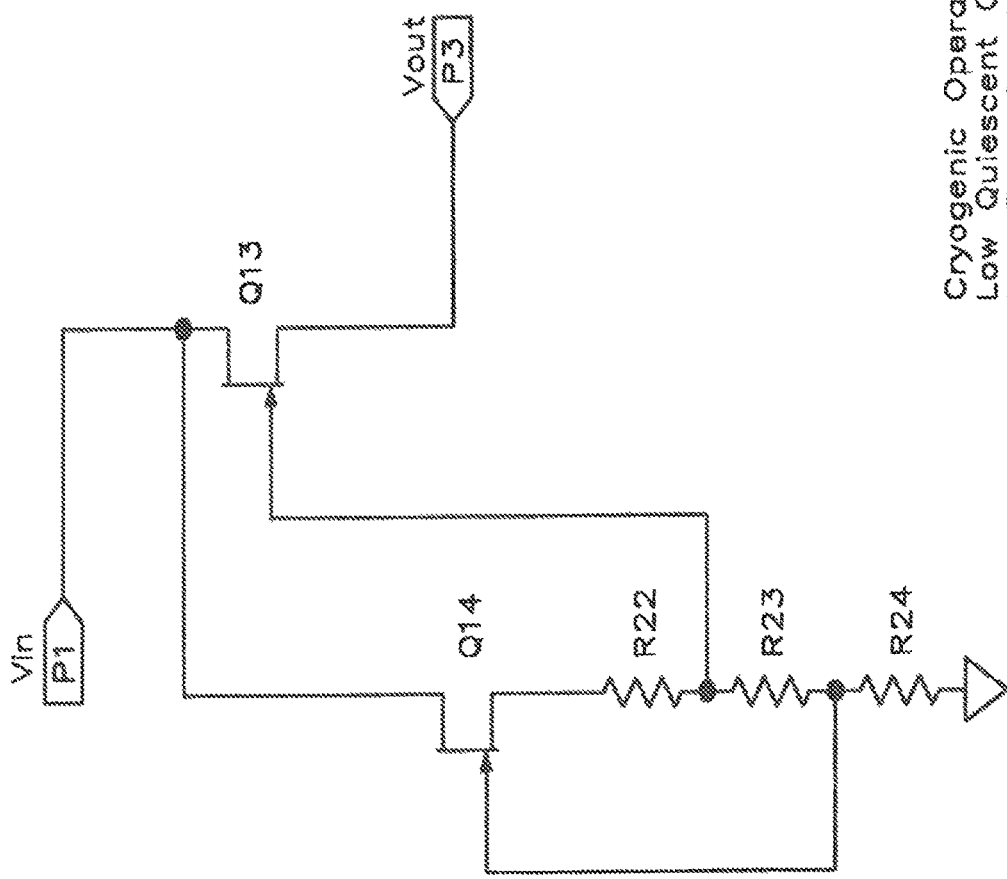
FIG. 1 is a circuit diagram for a linear regulator of the disclosed technology according to a first implementation.

In one implementation, as shown in FIG. 1, the voltage regulator can include an input voltage $V_{IN}$ that can be applied to (1) a drain of an N channel JFET transistor Q13 and (2) a drain of an N channel JFET transistor Q14. The N channel JFET transistor Q14 along with a resistor string forms of a voltage reference circuit. The resistor string can comprise resistors R22, R23 and R24.

In use, the voltage across the resistors R22 and R23 can be approximately equal to a pinch-off voltage of the N channel JFET transistor Q14 (a pinch-off voltage is a threshold voltage below which a JFET transistor turns off). In turn, since the current drawn by the N channel JFET transistor gates Q13 and Q14 is so low, the current through the resistor string is essentially constant. This current, multiplied by the ohmic value of the resistor string, applies a constant reference voltage to the gate of JFET transistor Q13.

In some implementations, the output voltage, $V_{OUT}$, which is the source voltage of JFET transistor Q13, is approximately the sum of the reference voltage, $V_{REF}$, plus the pinch-off voltage of JFET transistor Q13.

Furthermore, at the point that the input voltage $V_{IN}$ is close to a desired output voltage set point, JFET transistor Q13 is fully enhanced. Therefore, the output voltage $V_{OUT}$ is approximately equal to the input voltage $V_{IN}$, less a voltage drop across a channel resistance of JFET transistor Q13.

In some implementation, it may be desired to adjust the output voltage set point higher in which a value of resistor R24 can be increased. In some implementation, it may be desired to adjust the output voltage set point lower in which a value of resistor of resistor R22 can be increased.

In some implementation, the temperature coefficient of the reference voltage $V_{REF}$ may be compensated by selecting a temperature-compensated resistor of a known value in the lower position.

Some advantages to using a reference voltage generated by Q14's pinch-off voltage instead of using a Zener diode include, but are not limited to: (1) the reference voltage being adjustable by selecting the appropriate resistor in the R22, R23 and R24 string, (2) commonly available Zener diodes have higher current requirements than the JFET reference circuit thus using a Zener diode reference would likely cause a higher quiescent current drain and (3) the quiescent current drawn by the circuit of FIG. 1, at no load, is essentially the current drawn for the voltage reference circuit (based on the characteristics of the JFETs used, this current can be as low as several microamperes as compared to several milliamperes for a typical Zener rectifier).

Figure 2:
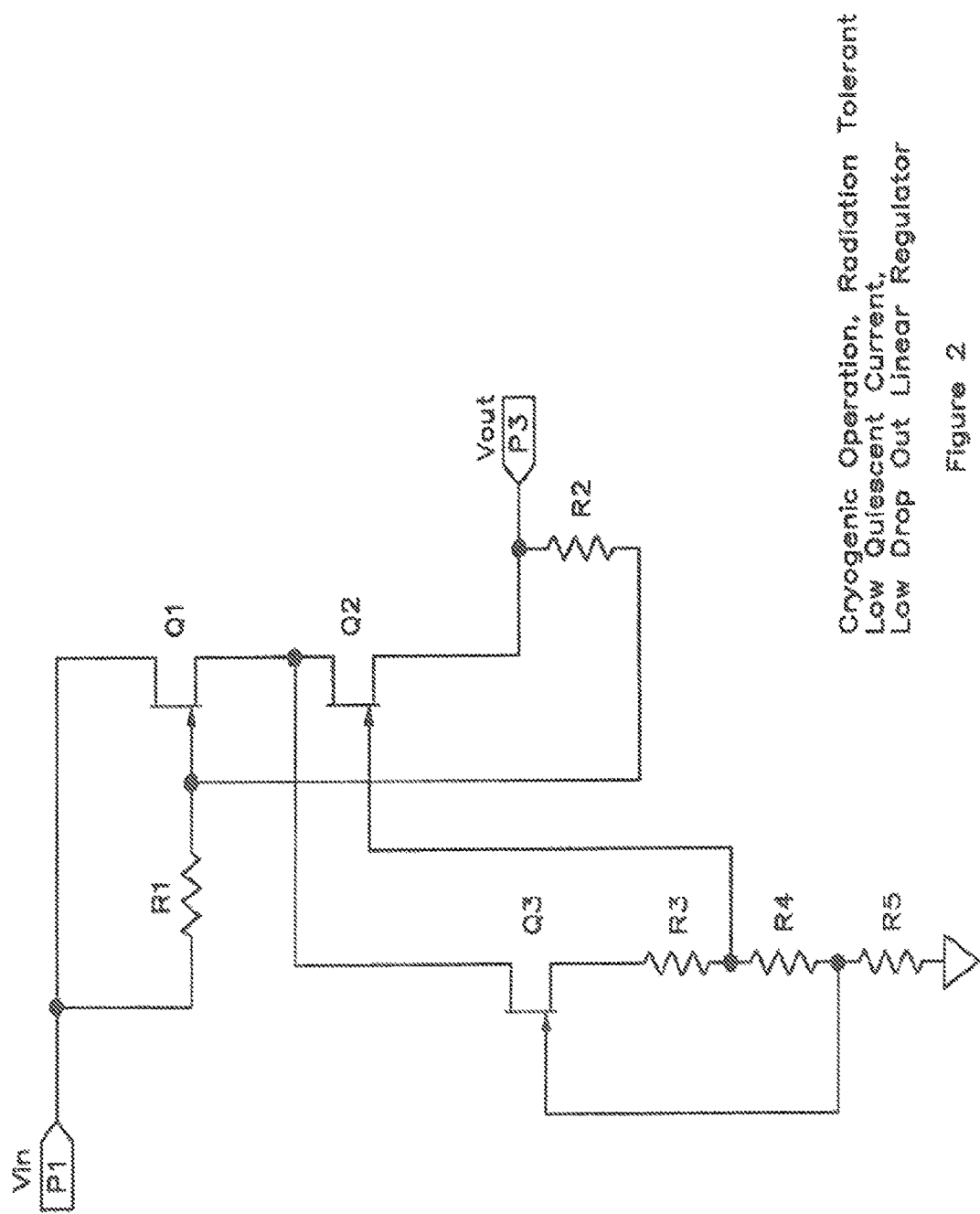
FIG. 2 is a circuit diagram for a linear regulator of the disclosed technology according to a second implementation.

Higher Input Voltage Version—FIG. 2

FIG. 2 shows a modification of the FIG. 1 circuit in the event the drain to source voltage rating of the JFETs is not high enough to withstand the maximum value of the input voltage.

Input voltage $V_{IN}$, can be applied to a series of N channel JFET transistors Q1 and Q2. A voltage reference circuit can be powered from the series of N channel JFET transistors at a midpoint between JFET transistors Q1 and Q2. The voltage reference circuit includes N channel JFET transistors Q3 and a resistor string comprised of resistors R3, R4. R5. When the input voltage $V_{IN}$ is near a desired output voltage set point, both JFET transistors Q1 and Q2 are enhanced. Therefore, the output voltage $V_{OUT}$ is approximately equal to the input voltage $V_{IN}$, less a voltage drop across the channel resistance of the JFET transistor Q1/Q2 series.

As the input voltage VI is increased above the output voltage set point, resistors R1 and R2 divide the difference between the input voltage $V_{IN}$ and the output voltage $V_{OUT}$. The gate of the upper JFET transistor Q1 is at a value of the voltage divider. The source of the upper JFET transistor Q1 is at a gate voltage plus the pinch off voltage of the JFET transistor Q1. In some implementations, if resistors R1 and R2 are approximately the same value, the input to output voltage is equal to half the amount of the input to output voltage, plus the pinch off voltage of JFET transistor Q1.

By using the circuit configuration of FIG. 2, the input to output voltage stress on the JFET transistors Q1 and Q2 is shared, and the circuit may be used at input voltages as much as twice the drain-source voltage rating of each individual JFET.

Also, since the voltage reference $V_{REF}$ generated by the voltage reference circuit is fed from a midpoint between JFET transistors Q1 and Q2, the voltage stress on the JFET transistor Q3 is also reduced.

The advantage of the disclosed circuit is that the quiescent current drawn by the circuits of FIG. 2 through FIG. 5, at no load, is essentially the current drawn for the voltage reference circuit plus the current drawn through the voltage divider resistors. In the circuits of FIGS. 2 through 5, a minimum load must be used in order to prevent the current flowing through the voltage dividers from raising the output voltage higher than the desired set point. If the voltage divider resistors have high values and based on the characteristics of the JFETs used, this quiescent current can be as low as several microamperes.

Higher Output Current Version—FIG. 3

FIG. 3 shows a modification of the FIG. 2 circuit that can deliver more current, based on similar JFET capability. Input voltage $V_{IN}$ can be applied to two JFET transistors series that are in parallel to each other. That is, N channel JFET transistors Q8 and Q10 connected in series and N channel JFET transistors Q9 and Q11 connected in series are connected in parallel to each other. That is, the JFET transistors Q8/Q10 series is connected in parallel to the JFET transistor Q9/Q11 series. A voltage reference circuit is powered from the paralleled JFET configuration Q8/Q9/Q10/Q11 at a midpoint between JFET transistors Q8 and Q10 and JFET transistors Q9 and Q11. The voltage reference circuit includes N channel JFET transistors Q12 and a resistor string comprised of resistors R18, R19, R20.

The paralleled JFET configuration Q8/Q9/Q10/Q11 includes a resistor divider comprising resistors R15 and R17. The resistor divider divides the difference between the input voltage $V_{IN}$ and the output voltage $V_{OUT}$. When paralleled JFETs are used, compared to single JFETs, the input output resistance at the point of regulation is halved and the output current rating is doubled.

For the paralleled JFET configuration, each parallel pair of JFETs is matched for pinch-off voltage. As in FIG. 2, the voltage reference circuit of Q12, R18, R19 and R20 is powered from the midpoint of the two pairs of series connected JFETs.

Even Higher Input Voltage Version—FIG. 4

FIG. 4 shows a variation of FIG. 2 for even higher input voltages, wherein three series connected JFETs are used for a higher voltage rating. In this circuit, the input to output voltage drop is shared among three series connected JFETs.

Input voltage $V_{IN}$ can be applied to N channel JFET transistors Q4, Q5 and Q6 connected in series. A voltage reference circuit is powered from the JFET transistors Q4/Q5/Q6 series at a midpoint between JFET transistors Q5 and Q6. The voltage reference circuit includes N channel JFET transistors Q7 and a resistor string comprised of resistors R12, R13, R14.

Two sets of resistor voltage dividers are used to force approximately equal voltage sharing between the three series connected JFET transistors (Q4, Q5 and Q6). A first resistor divider can comprise resistors R7, R8 connected between the input voltage $V_{IN}$ and a source of the JFET transistor Q5. This generates a gate voltage for JFET transistor Q4. A second resistor divider can comprise resistors R9, R10 connected between a source of the JFET transistor Q4 and a source of the JFET transistor Q6. This generates a gate voltage for the JFET transistor Q5.

The reference voltage, generated by the JFET transistor Q7 and resistors R12, R13 and R14, is powered from the drain of the JFET transistor Q6 and feeds the gate of the JFET transistor Q6.

In some implementations, this circuit can be adapted for even higher input voltages, by connecting additional JFETs in series and feeding each additional JFET gate from a two-resistor voltage divider.

Negative Input, Negative Output Version—FIG. 5

FIG. 5 shows a negative input, negative output voltage regulator circuit using P channel JFETs. It is similar to the circuit of FIG. 2, except the input and output voltages are negative. In some implementations, the circuits shown in FIGS. 1, 3 and 4 can also be implemented with P channel JFETs for negative input, negative output applications.

As shown in FIG. 5, negative input voltage $V_{IN}$ is applied to P channel JFET transistors Q5 and Q16 connected in series. A voltage reference circuit is powered from the JFET transistors Q15/Q16 series at a midpoint between JFET transistors Q15 and Q16. The voltage reference circuit includes P channel JFET transistors Q17 and a resistor string comprised of resistors R28, R29, R30.

A negative input voltage can be applied to JFETs Q15 and Q16 connected in series with the voltage reference circuit being powered from a midpoint between Q15 and Q16. When the input voltage is near the desired output voltage set point, both Q15 and Q16 are enhanced. Therefore, the output voltage is approximately equal to the input voltage, less the voltage drop across the channel resistance of Q15 and Q16 in series.

As the input voltage is increased above the output voltage set point, resistors R25 and R27 divide the difference between the input voltage and the output voltage. The gate of upper JFET Q15 is at the value of the voltage divider. The source of upper JFET Q15 is at the gate voltage plus the pinch-off voltage of Q15. If Resistors R25 and R27 are approximately the same value, the input to output voltage is equal to half the amount of the input to output voltage, plus the pinch-off voltage of Q15.

By using the circuit configuration of FIG. 5, the input to output voltage stress on JFETs Q15 and Q16 is shared, and the circuit may be used at input voltages as much as twice the drain-source voltage rating of each individual JFET.

Since the voltage reference generating JFET Q17 is fed from the Q15-Q16 mid-point connection, its voltage stress is also reduced.

The foregoing Detailed Description is to be understood as being in every respect illustrative and exemplary, but not restrictive, and the scope of the disclosed technology disclosed herein is not to be determined from the Detailed Description, but rather from the claims as interpreted according to the full breadth permitted by the patent laws. It is to be understood that the embodiments shown and described herein are only illustrative of the principles of the disclosed technology and that various modifications may be implemented by those skilled in the art without departing from the scope and spirit of the disclosed technology. Those skilled in the art could implement various other feature combinations without departing from the scope and spirit of the disclosed technology. Although the embodiments of the present disclosure have been described with specific examples, it is to be understood that the disclosure is not limited to those specific examples and that various other changes, combinations and modifications will be apparent to one of ordinary skill in the art without departing from the scope and spirit of the disclosed technology which is to be determined with reference to the following claims.

The invention claimed is:

1. A voltage regulator comprising:
   an input voltage;
   a first JFET transistor, the input voltage being applied to a drain of the first JFET transistor;
   a second JFET transistor, the second JFET transistor being in series with the first JFET transistor;
   a third JFET transistor;
   a resistor string, the resistor string including a first resistor, a second resistor and a third resistor, the resistor string and the third JFET transistor forming a voltage reference circuit having a reference voltage; and
   a voltage divider, the voltage divider including a fourth resistor and a fifth resistor, the fourth resistor and the fifth resistor dividing a difference between the input voltage and an output voltage,
   wherein the reference voltage generated from the voltage reference circuit is powered from a mid-point connection between the first JFET transistor and the second JFET transistor.

2. The voltage regulator of claim 1 wherein the first JFET transistor, the second JFET transistor and the third JFET transistor are N-channel JFET transistors.

3. The voltage regulator of claim 1 wherein the first JFET transistor, the second JFET transistor and the third JFET transistor are P-channel JFET transistors.

4. A voltage regulator comprising:
   an input voltage;
   a first JFET transistor series, the first JFET transistor series including a first JFET transistor and a second JFET transistor connected in series;
   a second JFET transistor series, the second JFET transistor series including a third JFET transistor and a fourth JFET transistor connected in series, the first JFET transistor series being in parallel with the second JFET transistor series;
   a fifth JFET transistor;
   a resistor string, the resistor string including a first resistor, a second resistor and a third resistor, the resistor string and the fifth JFET transistor forming a voltage reference circuit having a reference voltage; and
   a voltage divider, the voltage divider including a fourth resistor and a fifth resistor, wherein the voltage divider allows an input-output resistance at a point of regulation to be halved and an output current rating to be doubled.

5. The voltage regulator of claim 4 wherein the first JFET transistor, the second JFET transistor, the third JFET transistor, the fourth JFET transistor and the fifth JFET transistor, are N-channel JFET transistors.

6. The voltage regulator of claim 4 wherein the first JFET transistor, the second JFET transistor, the third JFET transistor, the fourth JFET transistor and the fifth JFET transistor are P-channel JFET transistors.

7. A voltage regulator comprising:
   an input voltage;
   a first JFET transistor, the input voltage being applied to a drain of the first JFET transistor;
   a second JFET transistor;
   a third JFET transistor, the first JFET transistor, the second JFET transistor the third JFET transistor being connected in series;
   a fourth JFET transistor;
   a resistor string, the resistor string including a first resistor, a second resistor and a third resistor, the resistor string and the fourth JFET transistor forming a voltage reference circuit having a reference voltage;
   a first voltage divider, the voltage divider including a fourth resistor and a fifth resistor, the fourth resistor and the fifth resistor being connected between the input voltage and a source of the second JFET transistor, and
   a second voltage divider, the second voltage divider including a sixth resistor and a seventh resistor, the second voltage divider being connected between a source of the first JFET transistor and a source of the third JFET transistor,
   wherein the first voltage divider and the second voltage divider are used to force approximately equal voltage sharing between the series of the first JFET transistor, the second JFET transistor the third JFET transistor.

8. The voltage regulator of claim 7 wherein the first JFET transistor, the second JFET transistor, the third JFET transistor and the fourth JFET transistor are N-channel JFET transistors.

9. The voltage regulator of claim 7 wherein the first JFET transistor, the second JFET transistor, the third JFET transistor and the fourth JFET transistor are P-channel JFET transistors.

* * * * *